United States Patent [19]

Hamman

[11] 4,082,311
[45] Apr. 4, 1978

[54] TRAILER HITCH ASSEMBLY

[76] Inventor: Willdoune Hamman, 2305 Bambi La., San Jose, Calif. 95116

[21] Appl. No.: 781,726

[22] Filed: Mar. 28, 1977

[51] Int. Cl.² .............................................. B60D 1/06
[52] U.S. Cl. ...................................... 280/507; 280/512
[58] Field of Search ............................... 280/511–514, 280/507; 285/91

[56] References Cited

U.S. PATENT DOCUMENTS

| | | | |
|---|---|---|---|
| 3,759,549 | 9/1973 | Morris | 280/512 |
| 3,820,823 | 6/1974 | Beaston | 280/512 |
| 3,831,982 | 8/1974 | Bernhardt et al. | 280/511 |
| 3,876,242 | 4/1975 | Eaton | 280/511 |

FOREIGN PATENT DOCUMENTS 104,442   7/1938   Australia ............................ 280/512

*Primary Examiner*—Kenneth H. Betts
*Assistant Examiner*—Norman L. Stack, Jr.
*Attorney, Agent, or Firm*—John J. Leavitt

[57] ABSTRACT

Presented is a trailer hitch assembly for use in connecting a trailer tongue to a conventional ball-type trailer hitch, including a socket member to grasp the trailer hitch ball while permitting pivotal movement of the trailer hitch assembly on the ball, and a sleeve mechanism for locking the trailer hitch assembly to prevent release of the trailer hitch ball by the trailer hitch assembly when the trailer hitch assembly is pivotally attached to a towing tractor, and which locks the trailer hitch assembly in a closed condition when the trailer is left unattended and disengaged from a tractor.

6 Claims, 5 Drawing Figures

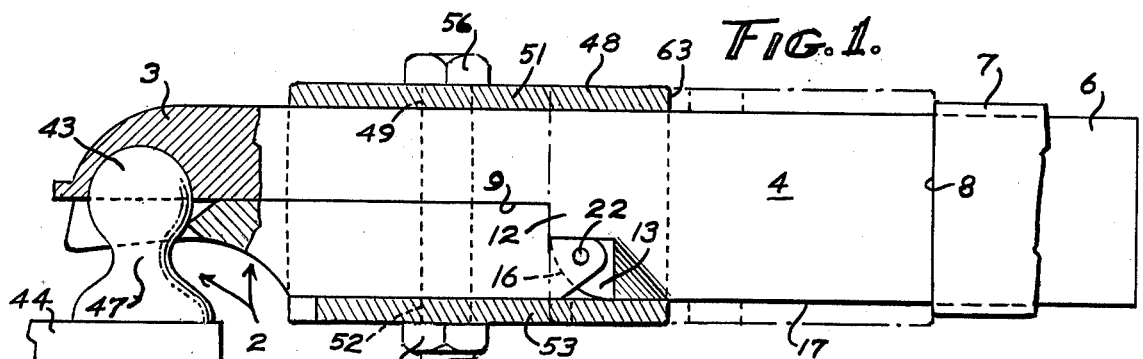
FIG. 1.
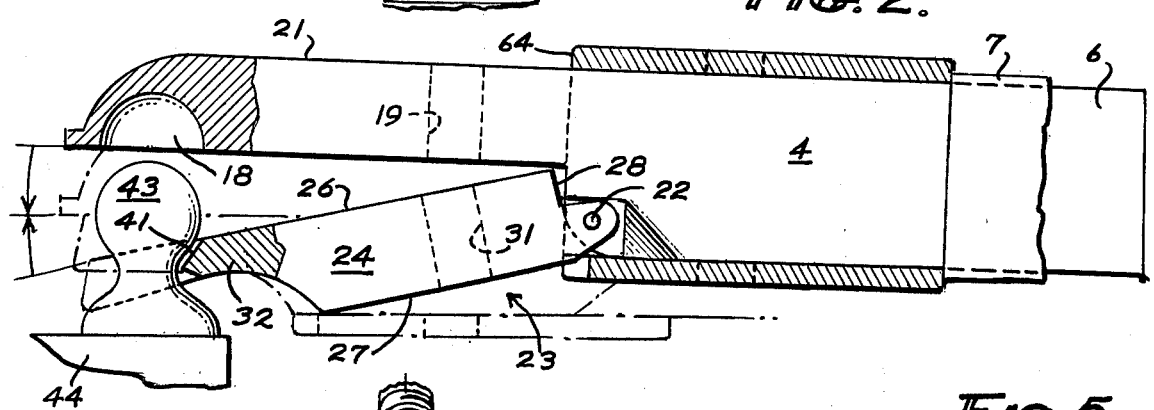
FIG. 2.
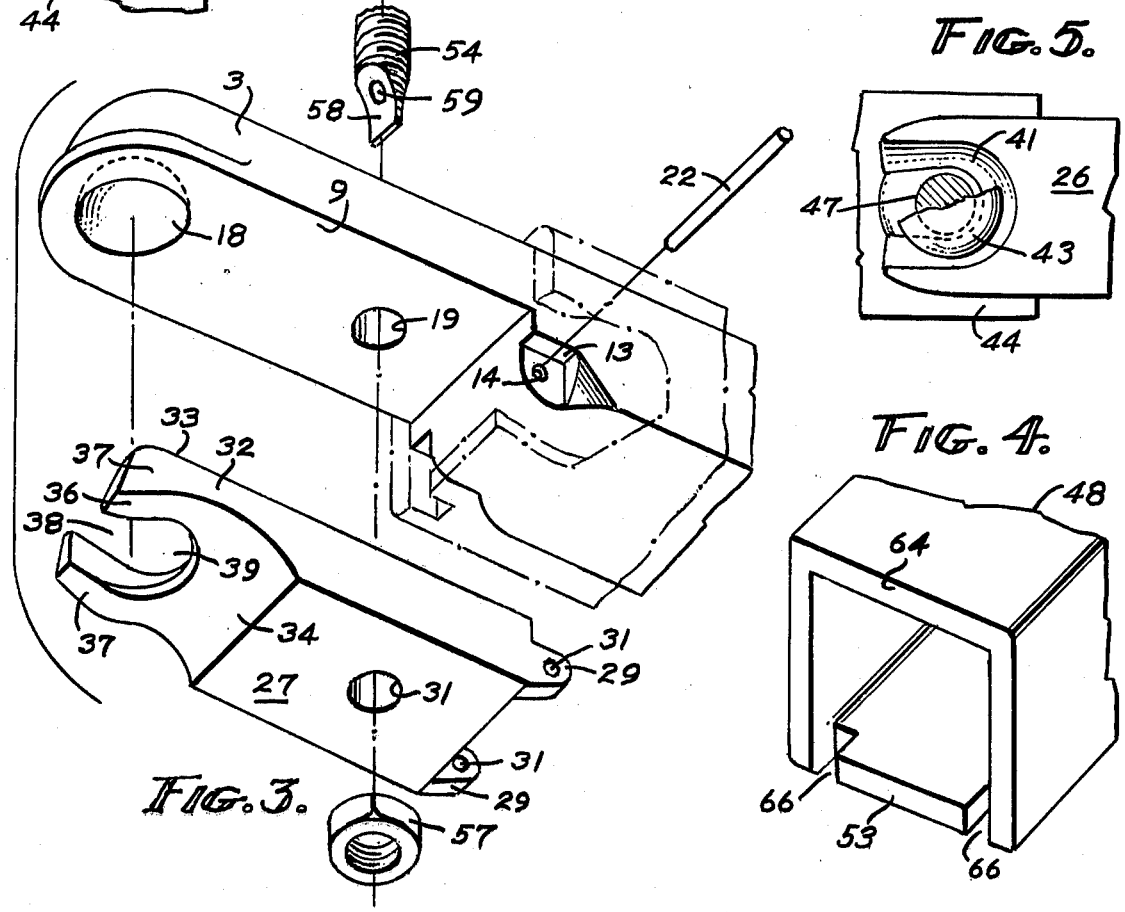
FIG. 5.
FIG. 3.
FIG. 4.

TRAILER HITCH ASSEMBLY

BACKGROUND OF THE INVENTION

1. Field of the Invention

This invention relates to trailer hitches, and particularly to trailer hitch assemblies of the socket type that interengage with a ball-type trailer hitch.

2. Description of the Prior Art

The prior art relative to the subject invention is believed to be found in Class 280, sub-classes 511, 512 and 513 for example.

A patent that appears to be pertinent is U.S. Pat. No. 3,820,823 which teaches the use of a sleeve movable between a forward locking position and a rear unlocking position, the sleeve being locked in a forward position through insertion of a stop plate inserted in a space between the rear edge of the sleeve and a pivot pin and between an actuating lever that actuates the sleeve and the tongue on which the sleeve is mounted.

One of the serious problems in the trucking industry, but which is not too well publicized, is the loss of valuable trailers and cargo within such trailers by the simple expedient of backing a tractor or towing vehicle to an unattended trailer and pulling it away to some location where its cargo may be offloaded. Accordingly, one of the objects of the present invention is to provide a trailer hitch assembly that may be locked in a closed condition so that the hitch assembly may not be actuated by unauthorized persons.

Another problem that has plagued truckers is the collection of grime and dirt and even pebbles in the trailer hitch mechanism, making it extremely difficult to actuate the mechanism to detach a trailer from the tractor to which it is connected. Accordingly, another object of the invention is the provision of a trailer hitch assembly that is constructed in such a way as to minimize the possibility of dirt and grime and extraneous materials from jamming the trailer hitch assembly.

A still further object of the invention is the provision of a trailer hitch assembly that may be locked in a closed condition when either connected or disconnected.

Still another object of the invention is the provision of a trailer hitch assembly that may be easily applied to already existing trailer tongues.

The invention possesses other objects and features of advantage, some of which, with the foregoing, will be apparent from the following description and the drawings. It is to be understood however that the invention is not limited to the embodiment illustrated and described, since it may be embodied in various forms within the scope of the appended claims.

SUMMARY OF THE INVENTION

In terms of broad inclusion, the trailer hitch assembly of the invention comprises an elongated generally quadrilateral square or rectangular tongue extension member including an end portion having a semi-spherical socket formed therein, and a bifurcated lock plate pivoted to the tongue extension portion and manipulable to lockingly engage a trailer hitch ball disposed within the socket to pivotally interlock the trailer hitch assembly to the trailer hitch ball. Sleeve means are provided on the elongated tongue extension member movable between a forward locking position and a rear unlocking position in which the lock plate is released to unlock the trailer hitch assembly from the trailer hitch ball. Means are provided interlocking the sleeve, tongue extension member and bifurcated lock plate when the sleeve is in its forward locking position to retain the sleeve in locking position.

BRIEF SUMMARY OF THE DRAWINGS

FIG. 1 is a side elevational view showing the trailer hitch assembly lockingly engaged to a trailer hitch ball, portions of the trailer hitch assembly being broken away to reveal the underlying structure.

FIG. 2 is a view similar to FIG. 1, but showing the trailer hitch assembly actuated so as to unlock the trailer hitch assembly from the trailer hitch ball.

FIG. 3 is a perspective view in exploded form to illustrate the relative positions of the parts.

FIG. 4 is a fragmentary perspective view of the forward end of the lock sleeve.

FIG. 5 is a fragmentary plan view illustrating the relationship between the lock plate and the trailer hitch ball, portions of the structure being broken away to reduce the size and to reveal underlying structure.

DESCRIPTION OF THE PREFERRED EMBODIMENT

In terms of greater detail, the trailer hitch assembly of the invention comprises a coupling assembly for detachably coupling or connecting a trailer unit to a tractor unit and designated generally by the numeral 2. The coupling assembly includes a socket member 3 comprising a fowardly projecting hardened steel connector plate extending integrally from a generally quadrilateral (square or rectangular) solid steel bar portion 4 the rear portion 6 of which is telescoped into and welded to a tubular trailer tongue member 7. The solid steel bar portion 4 thus constitutes an extension of the trailer tongue member. The transition from the forward edge 8 of the tubular tongue member 7 and the continuation of the solid steel bar member 4 forms a shoulder or abutment for purposes which will hereinafter be explained.

The socket member 3 is preferably formed integrally from the generally square or rectangular bar 4 by cutting the bar 4 lengthwise to provide an undercut or lower surface 9 defined at one end by a shoulder 12 which is rabbeted on opposite side to provide shallow recesses 13. A bore 14 is provided in the shoulder 12 extending from one side of the bar to the other, with opposite ends of the bore terminating in the recesses, and the forward face 16 of the shoulder is curved as shown so that the shoulder merges smoothly with the bottom surface 17 of the solid steel bar 4. It will thus be seen that the construction, including the tongue member 7 and the attached bar 4 with its forwardly projecting integral socket member 3 is extremely strong and monolithic, thus contributing to the integrity of the structure.

The socket connector plate 3 of the coupling assembly also includes at its extreme forward end portion a semispherical socket or recess 18 formed as a depression in the underface 9 of the forwardly projecting connector plate 3. Additionally, the socket connector plate 3 is provided with a bore 19 that extends between the top surface 21 thereof and the underface 9 for purposes which will hereinafter be explained.

Pivotally mounted to the shoulder 12 by a hardened pivot pin 22 journaled in the bore 14 is a hardened steel lock plate designated generally by the numeral 23 and including a heavy steel central portion 24 having a top surface 26 and a lower surface 27 as shown. Projecting rearwardly from the rear edge 28 of the lock plate 23 are a pair of spaced integral mounting lugs 29, each bored to provide an aperture 31 through which the pivot pin 22 may be inserted. The spacing of the lugs 29 is such that they snugly embrace the shoulder 12 and lie in the shallow recesses 13 on opposite ends of the shoulder as illustrated in FIGS. 1 and 2. It will thus be seen that with the lugs 29 snugly embracing the shoulder 12, insertion of the pivot pin 22 through the apertures 31 in the lugs and the bore 14 in the shoulder will pivotally journal the lock plate 23 to the bar 4. The thickness of the lock plate 23 between the top surface 26 and the bottom surface 27 is such that when the lock plate is pivoted into the position illustrated in FIG. 1, where its top surface 26 is contiguous with the bottom surface 9 of the socket connector plate, the overall dimension of the connector plate 3 and lock plate 23 is no more than the vertical dimension of the bar 4.

It will be seen that the lock plate 3 is also provided with a bore 31 that extends between the top surface 26 and the bottom surface 27 and which is located in relation to the pivotal axis of the pivot pin 22 such that when the lock plate 23 is raised into the position illustrated in FIG. 1, the bore 31 in the lock plate lies axially aligned with the bore 19 in the connector plate 3, the two bores constituting extensions of each other in this position of the parts.

Additionally, the lock plate 23 is provided with a reduced-in-thickness forwardly projecting portion 32 the top surface 33 of which constitutes a continuation of the flat surface 26 of the central body portion of the lock plate 23, while the reduction in thickness of the forwardly projecting portion of the lock plate is caused by undercutting of the plate in such a way that a curved shoulder 34 is provided merging with the under surface 27 of the lock plate in a rearward direction, but merging smoothly with the under surfaces 36 of a pair of forwardly projecting fingers 37 constituting the bifurcated forward end of the lock plate 23. The forwardly projecting fingers 37 are spaced apart to provide a throat 38 therebetween having a dimension substantially less than the diameter of the socket recess 18 or the trailer hitch ball adapted to be seated therein, while the forward end portions of the fingers 37 increase in thickness between the top and bottom surfaces thereof. The throat 38 opens into a generally enlarged aperture 39 the peripheral edges of which are appropriately chamfered as at 41.

It will thus be seen that the coupling assembly may be detachably interengaged with a ball coupler unit designated generally by the numeral 42 and including a spherical ball unit 43 securely attached to a draw bar 44 fixed to a tractor by a bolt 45 and a nut 46. The ball unit 43 is provided with a necked-down portion 47 which cooperates with the throat 38 in the lock plate 23 to permit passage of the spherical ball 43 of the ball unit into the recess 39 where the underside of the sperical ball is proportioned to bear against the chamfered surface 41 of the aperture.

Thus, with the ball 43 engaged in the socket 18 of the socket connector plate 3, pivoting the lock plate 23 upwardly into the position illustrated in FIG. 1, will effect locking of the ball unit to the socket unit, and this interlocking yet pivotal interconnection is maintained by a lock sleeve 48 adapted to slide forwardly and rearwardly on the bar 4. The sleeve 48 is complimentary to the square or rectangular configuration of the solid steel bar 4, and is provided with an aperture 49 through its top wall 51 and an aperture 52 through bottom wall 53 and in alignment with aperture 49. When the sleeve 48 is moved forwardly into the position illustrated in FIG. 1, the apertures 49 and 52 align themselves with the bores 19 and 31 so as to permit insertion of a case-hardened bolt 54 therethrough. The bolt 54 is provided with a head 56 at one end, and is threaded at its opposite end to receive a nut 57. The threaded end of the bolt opposite the head is provided with a generally chisel-shaped point 58, and a transversally extending aperture 59 through which the hasp 61 of a padlock 62 may be inserted for purposes of security.

It will thus be seen that in the position of the parts of the coupling assembly as illustrated in FIG. 1, the sleeve 48 prevents opening or unlocking of the lock plate 23 from the ball unit even if the case-hardened bolt 54 is not in place. The case-hardened bolt 54 with the attached padlock 62 obviously provides security to prevent unauthorized persons from unhitching the trailer from the towing vehicle.

When it is desired to effect unhitching, the padlock is unlocked, removed from the aperture 59, and the nut 57 is removed from bolt 54. The bolt is then withdrawn from the assembly so as to permit the sleeve 48 to slide rearwardly (to the right) as viewed in FIG. 1 until the rear edge 63 of the sleeve 48 abuts the shoulder formed by the forward edge 8 of the tubular tongue member 7. When the sleeve 48 is in this position as illustrated in FIG. 2, the forward edge 64 of the sleeve is positioned just forwardly of the pivot pin 22, covering opposite ends of the pivot pin, thus preventing inadvertent loss of the pivot pin 22 and, for security purposes, preventing the intentional withdrawl of the pivot pin. To permit pivotal movement of the lock plate 23 when the sleeve 48 is in this position, the lower wall 53 of the sleeve 48 adjacent its forward edge 64 is provided with a pair of spaced notches or recesses 66 spaced and proportioned to permit the lugs 29 to rest snugly therein when the lock plate 23 is pivoted downwardly into the attitude illustrated in FIG. 2.

I claim:

1. A trailer hitch assembly for a vehicle adapted to be towed by a towing vehicle or tractor equipped with a ball coupling unit, the combination comprising:
    (a) a bar member adapted to be attached to the tongue of a vehicle to be towed and constituting an extension thereof, said bar member including a central body portion and a forwardly projecting reduced-in-thickness connector plate portion including a semi-spherical recess therein;
    (b) a lock plate pivotally mounted on said bar member and including a bifurcated forward end portion proportioned to cooperate with the ball unit of a coupling assembly to lock the trailer hitch assembly to said ball unit;
    (c) a sleeve slidably disposed on said bar member and movable between a forward locking position and a rear unlocking position in which said lock plate is free to pivot in relation to said bar member, thereby enabling engagement of said trailer hitch assembly on said trailer hitch ball unit; and
    (d) means interengageable with said sleeve, forwardly projecting connector plate portion and lock plate to detachably lock the trailer hitch assembly in a closed condition.

2. The combination according to claim 1, in which said trailer hitch assembly includes an abutment to limit rearward movement of said sleeve.

3. The combination according to claim 1, in which said means interengageable with said sleeve, connector plate and lock plate includes a case-hardened bolt extending through said sleeve, forwardly projecting connector plate and said lock plate, and a padlock engageable with the free end of said case-hardened bolt.

4. The combination according to claim 1, in which said sleeve includes a forward end portion which overlaps the pivotal axis of said lock plate when said sleeve is in its rearmost position.

5. The combination according to claim 1, in which said bar member is quadrilateral, said sleeve is tubular and slidably envelopes said bar member, and the connector plate and lock plate when contiguous are slidably received within said sleeve to retain said connector plate and lock plate in contiguous interlocking relationship with an associated ball unit.

6. The combination according to claim 1, in which means are provided interposed between said lock plate and said sleeve when the sleeve is in its retracted position to form an abutment limiting pivotal movement of said lock plate in an opening direction.

* * * * *